United States Patent [19]

Goldstein et al.

[11] Patent Number: 5,012,719
[45] Date of Patent: May 7, 1991

[54] METHOD OF AND APPARATUS FOR GENERATING HYDROGEN AND PROJECTILE ACCELERATING APPARATUS AND METHOD INCORPORATING SAME

[75] Inventors: Yeshayahu S. A. Goldstein, Gaithersburg; Derek A. Tidman, Silver Spring, both of Md.; David Fleischer, Great Falls, Va.

[73] Assignee: GT-Devices, Alexandria, Va.

[21] Appl. No.: 61,214

[22] Filed: Jun. 12, 1987

[51] Int. Cl.$^5$ .................................................. F41B 6/00
[52] U.S. Cl. .................................... 89/8; 60/39.050; 60/39.461; 60/207; 102/531; 204/164; 124/3
[58] Field of Search ............... 60/202, 203.1, 205, 60/206, 207, 218, 219, 220, 39.05, 39.461; 89/7, 8; 102/440, 530, 531; 124/3; 204/58, 96, 129, 164; 423/657

[56] References Cited

U.S. PATENT DOCUMENTS

| | | | |
|---|---|---|---|
| 1,358,296 | 11/1920 | Csanyi | 89/7 |
| 1,470,591 | 10/1923 | Behar | 102/430 |
| 2,783,684 | 3/1957 | Yoler | 89/7 |
| 2,790,354 | 4/1957 | Yoler et al. | 89/8 |
| 2,804,804 | 9/1957 | Cumming | 89/7 |
| 2,872,846 | 2/1959 | Crozier | 89/7 |
| 3,427,808 | 2/1969 | Butcher | 60/203.1 |
| 3,902,425 | 9/1975 | Kurtzemann | 102/430 |
| 3,945,899 | 3/1976 | Nikaido et al. | 204/58 |
| 3,985,866 | 10/1976 | Oda et al. | 423/657 |
| 4,034,497 | 7/1977 | Yanda | 102/530 |
| 4,269,659 | 5/1981 | Goldberg | 176/9 |
| 4,302,259 | 11/1981 | Ward | 149/61 |
| 4,340,580 | 7/1982 | Suzuki | 423/657 |
| 4,424,086 | 1/1984 | Christopher | 102/286 |
| 4,590,842 | 5/1986 | Goldstein et al. | 89/8 |
| 4,658,699 | 4/1987 | Dahm | 89/8 |
| 4,711,154 | 12/1987 | Chryssomallis et al. | 89/7 |
| 4,715,261 | 12/1987 | Goldstein et al. | 89/8 |
| 4,752,463 | 6/1988 | Nagira et al. | 423/657 |

OTHER PUBLICATIONS

Kaye, Seymour M., Encyclopedia of Explosives and Related Items, "Plasma", 1978, pp. P307–P310.
Gessner G. Hawley, The Condensed Chemical Dictionary, 1971, pp. 455–456.

*Primary Examiner*—Stephen C. Bentley
*Attorney, Agent, or Firm*—Lowe, Price, LeBlanc, Becker & Shur

[57] ABSTRACT

A projectile is accelerated through a barrel by a high pressure hydrogen gas jet that is derived by exothermically reacting water or a water-hydrogen peroxide liquid mixture with metal or a metal hydride. The temperature of the reaction is controlled by controlling the power in a plasma discharge applied to a reaction chamber containing the liquid and particles of the metal or metal hydride. A non-vaporous metal oxide resulting from the reaction is centrifugally separated from the hydrogen that drives the projectile.

77 Claims, 2 Drawing Sheets

METHOD OF AND APPARATUS FOR GENERATING HYDROGEN AND PROJECTILE ACCELERATING APPARATUS AND METHOD INCORPORATING SAME

TECHNICAL FIELD

The present invention relates generally to an apparatus for and method of generating hydrogen and more particularly to generating hydrogen by exothermically reacting a liquid containing hydrogen and oxygen with elemental metal or a metal hydride in response to electric energy preferably in the form of a plasma arc. In accordance with another aspect of the invention, the invention is directed to a method of and apparatus for accelerating a projectile with the use of high pressure hydrogen gases derived by exothermically reacting a liquid containing hydrogen and oxygen and elemental metal or a metal hydride.

BACKGROUND ART

It is known that hydrogen can be generated by exothermically reacting water and elemental metal or a metal hydride. The reaction involves producing hydrogen gas ($H_2$) and an oxide of the metal.

It is also known that a high temperature, high pressure plasma jet can be derived by applying a discharge voltage between spaced electrodes along a capillary passage having a dielectric wall with ionizable material thereon. In response to the discharge, the ionizable material is ablated from the wall to produce a plasma discharge in the capillary passage, i.e., a passage having a length to diameter ratio of at least 10:1. Because of the capillary nature of the passage, the impedance of the discharge between a pair of electrodes at opposite ends of the passage is relatively high, such as 0.1 ohms, to facilitate matching of the discharge load to a power supply that derives the discharge voltage. The power in the discharge can be controlled by shaping a pulse output of the power supply. This high pressure plasma source has been used for propelling projectiles, generally initially located in a barrel downstream of the passage open end.

It is also known to provide a cooling medium between an outlet of the plasma source and the projectile initial location. The cooling medium includes elements that are vaporized by the plasma to serve as a fuel source for propelling the projectile through the barrel.

To maximize the velocity of the projectile as it leaves the barrel, it is preferable for the pressure in the barrel to remain relatively constant, even though the barrel length behind the projectile effectively increases as the barrel moves through the barrel. To provide a constant pressure in the barrel behind the projectile as the projectile is being accelerated through the barrel, the power supply pulse is preferably shaped so that the power in the discharge increases substantially linearly as a function of time as the projectile is being accelerated. This linear increase of the power occurs while the projectile moves through about the first third of the barrel.

DISCLOSURE OF INVENTION

In accordance with one aspect of the invention, the exothermic reaction of a liquid containing hydrogen and oxygen (e.g. water or a mixture of water and hydrogen peroxide) with elemental metal or a metal hydride is controlled by the application of electric energy, preferably a plasma discharge, to produce gaseous hydrogen having high pressure properties. The metal or metal hydride and the controlled temperature of the plasma are selected so that the resulting metal oxide is not vaporized by the plasma discharge arc. Because the plasma has very predictable and controllable temperature properties, dependent upon the nature of the low atomic weight materials ablated from the walls of the capillary passage and the power in the discharge, the temperature of the reaction can be controlled to prevent vaporization of the metal oxide. Since the metal oxide is not in a vapor state, it is easily separated from the gaseous hydrogen to provide a high pressure hydrogen source that is free of virtually all other elements.

It is highly advantageous for the high pressure source to include only hydrogen, and no other elements, because hydrogen has the lowest molecular weight and therefore highest sound speed of any element. By separating hydrogen from all other materials in the reaction, there are no higher molecular weight atoms to impede the forward movement of the projectile. The hydrogen is at a sufficiently low temperature, e.g. $2,000°-4,000°$ K., to avoid ablation of the barrel wall so that high atomic weight elements, e.g. iron, remain in situ on the barrel, to prolong barrel life and have no adverse effect on the hydrogen sound speed.

In one embodiment, the elemental metal or metal hydride and the liquid are located in different compartments of a structure, preferably having a honeycomb configuration, between the outlet of the plasma source and a projectile load. The honeycomb structure is fabricated of a material that is melted and vaporized by the plasma discharge, so that the elemental metal or metal hydride, in particle form, mixes with the liquid in the presence of the heat of the plasma to cause the exothermic reaction. Some of the honeycomb passages are empty so that the plasma flows easily through them, to promote melting throughout the length of the honeycomb structure and enhance mixing of the elemental metal or metal hydride with the liquid. The honeycomb passages are filled with the liquid and elemental metal or metal hydride by amounts proportional to the mole fractions of the reactants in the exothermic reaction between the elemental metal or metal hydride and the liquid to produce the gaseous hydrogen and the metal oxide.

To enable the invention to function as a pure hydrogen gas generator, a centrifugal separator is located downstream of the honeycomb structure. The centrifugal separator need not include any moving parts, but can merely rely on the intrinsic properties of the light hydrogen gas molecules collecting in the center of a reaction chamber and the greater density liquid metal oxide molecules spiraling to the outer portion of the chamber to be collecting by an appropriate structure.

As indicated supra, the liquid is preferably water ($H_2O$) or a mixture of water and hydrogen peroxide ($H_2O_2$). If the mixture is used it should have an $H_2O_2$:$H_2O$ volumetric ratio no greater than about 7:3 to provide stability for prevention of spontaneous decomposition. The mixture has the advantage of the $H_2O_2$ reaction being more exothermic than for water, to reduce the heating requirements of the plasma, which in turn lowers the amount of energy needed from the power supply. By reducing the power supply energy demands, the volume and weight of the supply are accordingly lowered. The reduction in power supply requirements through the use of the $H_2O_2$—$H_2O$ mixture more than offsets the disadvantage of the heavier weight of $H_2O_2$ than $H_2O$.

It is, accordingly, an object of the present invention to provide a new and improved apparatus for and method of generating hydrogen.

Another object of the invention is to provide a new and improved method of and apparatus for generating hydrogen by exothermically reacting a liquid containing oxygen and hydrogen and elemental metal or a metal hydride to produce a high pressure hydrogen gas jet that subsists for a relatively short controlled time interval, such as on the order of a few milliseconds, and which can be derived in a time interval on the order of a few microseconds.

An additional object of the invention is to provide a new and improved apparatus for and method of generating hydrogen gas by exothermically reacting an elemental metal or a metal hydride with a liquid containing hydrogen and oxygen in response to a plasma.

A further object of the invention is to provide a new and improved apparatus for and method of controllably generating hydrogen gas by exothermically reacting a liquid containing hydrogen and oxygen with elemental metal or a metal hydride and for separating the resulting metal oxide from the gaseous hydrogen.

Still another object of the invention is to provide a new and improved apparatus for and method of accelerating a projectile in response to energy from a pulsed plasma jet.

Still another object of the invention is to provide a new and improved apparatus for and method of launching a projectile from a barrel in response to a pulsed plasma jet which is cooled by a source of fuel that is responsive to the jet.

A further object of the invention is to provide a new and improved apparatus for and method of launching a projectile from a barrel in response to a gas produced by an exothermal chemical reaction which causes relatively low temperature, high pressure hydrogen gas to be introduced into a barrel in which the projectile is initially located.

Still an additional object of the invention is to provide a new and improved apparatus for and method of launching a projectile from a barrel in response to relatively low temperature, high pressure hydrogen gas being generated by an exothermic reaction that is initiated by a controlled plasma discharge.

Still a further object of the invention is to provide a new and improved apparatus for and method of propelling a projectile to very high velocity in response to an exothermic chemical reaction that produces gases having very high sound speed and low atomic weight elements, at relatively low temperature, so that a barrel through which the projectile is accelerated does not have a likelihood of being ablated.

The above and still further objects, features and advantages of the present invention will become apparent upon consideration of the following detailed description of several specific embodiments thereof, especially when taken in conjunction with the accompanying drawings.

BEST MODE FOR CARRYING OUT THE INVENTION

Figure 1:
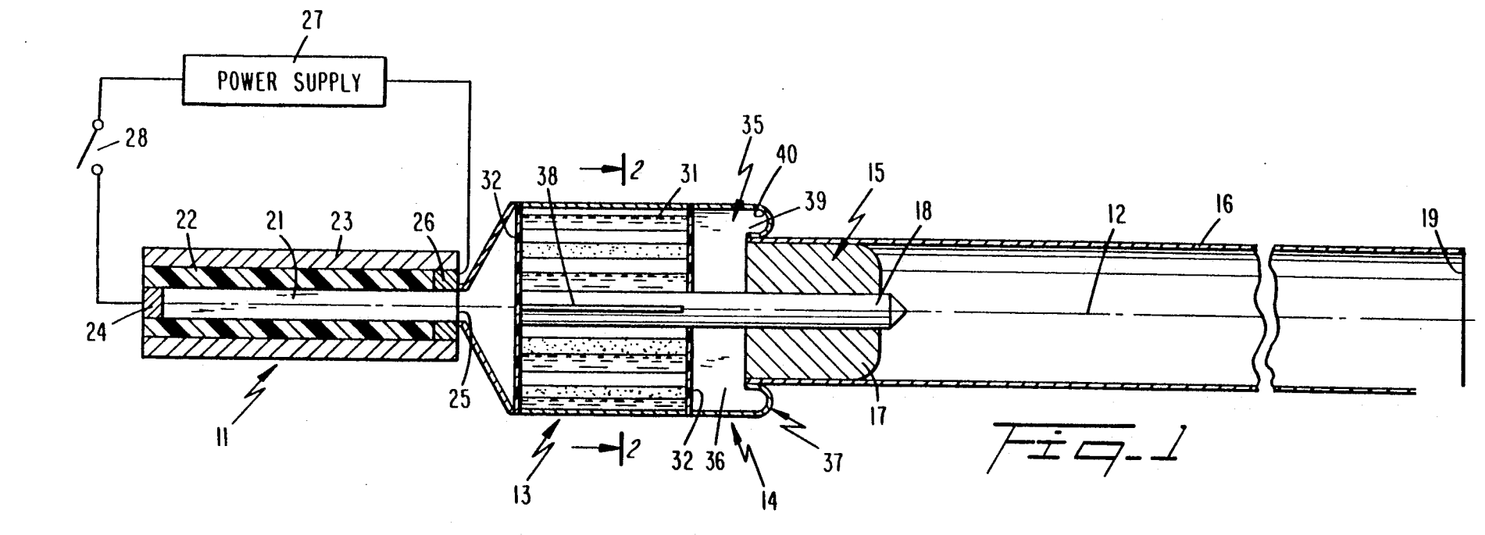
FIG. 1 is a schematic, cross-sectional view of one embodiment of a projectile launcher in accordance with the present invention wherein a reaction chamber responsive to a plasma discharge includes a honeycomb structure with a liquid containing hydrogen and oxygen and metal or metal hydride powder.

Reference is now made to FIG. 1 of the drawing wherein there is schematically illustrated, in cross-section, a plasma source 11 which derives a high pressure, high temperature pulsed plasma jet that is propagated along axis 12 toward cylindrical reaction chamber 13 containing a liquid including hydrogen and oxygen (e.g. water or a water-hydrogen peroxide mixture) and an elemental metal or a metal hydride having a large surface area. In chamber 13, the elemental metal or metal hydride exothermically reacts with the liquid to form gaseous hydrogen and a non-vaporous, semi-liquid oxide of the metal. The exothermic chemical reaction of the liquid and metal or metal hydride is controlled by the temperature of the plasma jet. Initially, the exothermic chemical reaction beings in the center of chamber 13, along axis 12, and expands radially and axially within the chamber as a result of the jet properties of the plasma.

The hydrogen gas formed in chamber 13, having a molecular weight of two, has a very high sound speed and low density. Because the hydrogen has such a low density it is forced by the higher molecular weight non-vaporous metal oxide molecules toward axis 12. The hydrogen gas has a very high pressure of several kilobars, and moderate temperature, typically between 2000°–4000° K. The hydrogen gas is separated, basically by a centrifugal process, from the semi-liquid metal oxide in separator 14.

The high pressure, high sound speed hydrogen gas is fed from separator 14 against the back of projectile assembly 15 positioned in barrel 16, that is coaxial with axis 12. Projectile assembly 15 is coaxial with axis 12 and includes sabot 17, having an outer diameter slightly less than the diameter of barrel 16 into which the sabot snugly fits. Projectile assembly 15 also includes projectile 18 that is connected to sabot 17, but is separated from the sabot after the projectile assembly is shot from muzzle 19 of barrel 16. The high sound speed, high pressure hydrogen gas generated in chamber 13 and flowing axially through separator 14 acts against the rear face of sabot 17 to drive projectile assembly 15 through barrel 16.

A preferred configuration for plasma source 11 includes an elongated capillary passage 21 in dielectric tube 22 that is surrounded by steel casing 23. One end of passage 21 is plugged by electrode 24, while the other end of the passage is open to form orifice 25 that is surrounded by annular electrode 26. Electrodes 24 and 26 are connected to opposite terminals of shaped DC power supply 27 via switch 28. Preferably, power supply 27 derives a waveform such that the square of the current coupled by the supply to electrodes 24 and 26 increases linearly as a function of time after the temperature of the plasma jet propagating from nozzle 25 has reached a sufficiently high temperature to initiate the exothermic reaction in chamber 13. The wall of dielectric tube 22 contains low atomic weight elements, such as carbon and hydrogen, preferably formed as polyethylene. The low atomic weight elements are ablated from the wall of passage 21 in response to a discharge established between electrodes 24 and 26 by the voltage of power supply 27 when switch 28 is closed.

The structure of pulsed plasma jet source 11 is described in greater detail in the commonly assigned patent of Goldstein et al, U.S. Pat. No. 4,590,842 and in the co-pending application of Goldstein et al, U.S. Ser. No. 809,071, filed Dec. 13, 1985, entitled "Plasma Propulsion Apparatus and Method". In application Ser. No. 809,071 it is indicated that the square of the current applied to the electrodes of the plasma generator preferably increases linearly as a function of time, so that the power in the discharge between the electrodes of the plasma generator increases linearly as a function of time, to enable the pressure of a projectile accelerated by the plasma jet to be maintained constant.

In accordance with the present invention, the energy which is applied to projectile assembly 15 is a very large percentage (for example, 50% –60%) of the energy coupled by supply 27 to electrodes 24 and 26. This very high percentage is achieved because of the heat generated by the exothermic chemical reaction in chamber 13 in response to the high temperature, high pressure plasma. A further advantage of the present invention is that the hydrogen gas which is applied to projectile assembly 15 and which flows through barrel 16 is controlled by the power coupled by supply 27 to electrodes 24 and 26 so the hydrogen gas is at a relatively low temperature, frequently less than 3,000° K. Thereby, melting problems in barrel 16 are avoided so barrel mechanical stability is achieved and heavy molecules from the barrel do not form a vapor that would reduce the sound speed of the high pressure hydrogen in the barrel.

The temperature of the plasma jet coupled by source 11 through nozzle 25 into chamber 13 is such that the metal oxide remains in a non-vaporous form that is easily separated from the gaseous hydrogen. The metal oxide is in a semi-liquid, somewhat plastic state in response to the heat of the plasma and the exothermic reaction, but does not achieve a vaporous state. Thereby, the gases which act against projectile assembly 15 and which flow through barrel 16 are confined to the high sound speed, high pressure hydrogen gas which is not mixed with any significant amounts of the high molecular weight, low sound speed metal oxide. If the metal oxide were significantly mixed with the hydrogen, the sound speed of the hydrogen gas and the velocity of projectile assembly 15 would be considerably less than what would be the case for relatively pure hydrogen.

Figure 2:
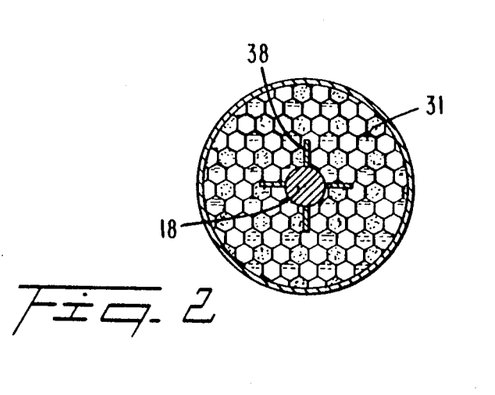
FIG. 2 is a cross-sectional view of the honeycomb structure illustrated in FIG. 1.

One preferred embodiment for the contents of chamber 13 is illustrated in FIGS. 1 and 2 as including multi-compartmented honeycomb structure 31, having elongated compartments with longitudinal axies parallel to axis 12. Different compartments of honeycomb structure 31 are filled with particles of the elemental metal or metal hydride, the liquid containing hydrogen and oxygen, as well as air. Each end face of honeycomb structure 31 is closed by membranes 32, fabricated of a low atomic weight dielectric material which is consumed or vaporized by the plasma jet and the heat of the exothermic reaction. Preferably, membranes 32 are fabricated of polyethylene so that small amounts of carbon gas and hydrogen are released when the membranes are consumed.

In the illustrated configuration, certain compartments in honeycomb structure 31 are filled exclusively with particles, preferably powder size, of the elemental metal or of the metal hydride, while other compartments are filled exclusively with water or water peroxide mixture. Other compartments of honeycomb structure 31 are empty, i.e., have no liquid or solid therein, to enable the pulsed plasma jet from source 11 to propagate rapidly through the honeycomb structure and provide a rapid build-up and fast reaction time for the exothermic reaction; typically, the reaction begins within tens of microseconds of the time that the plasma discharge is established in capillary tube 21 and subsists for an interval on the order of a few milliseconds.

Separating the metal or metal hydride powder from the liquid in different compartments of honeycomb structure 31 has the advantage of long shelf life if there is any likelihood of the liquid and metal or metal hydride powder reacting under ambient conditions. Alternatively, the liquid and metal or metal hydride can be stored in the same compartments of honeycomb structure 31. If the metal or metal hydride is intermixed with liquid in the same compartments of structure 31 particles of the metal or metal hydride are coated with a water insoluble material that is evaporated in response to the heat from the plasma jet of source 11. As a further alternative, first and second separate honeycomb structures abut against each other so they are displaced from each other along axis 12. The first honeycomb structure contains the liquid including hydrogen and oxygen, as well as air compartments and is located upstream of the second honeycomb structure with compartments for air and the metal or metal hydride. In this arrangement the plasma jet initially heats the liquid in the first honeycomb structure to superheated steam. The superheated steam then exothermically reacts with the elemental metal or metal hydride in the second honeycomb structure.

Honeycomb structure 31 is preferably fabricated of a hydrocarbon, dielectric material, such as polyethylene, or the elemental metal or the metal hydride. If honeycomb structure 31 is made of a hydrocarbon, the hydrocarbon is heated by the pulsed plasma jet to a vapor state to produce elemental carbon gas and hydrogen gas that assist in driving projectile assembly 15. If honeycomb structure 31 is fabricated of the elemental metal or the metal hydride, the plasma jet causes the metal or metal hydride to react exothermically with the liquid to form hydrogen gas and the non-vaporous metal oxide. The products of the reaction between the metal or metal hydride forming honeycomb structure 31 and the liquid in the honeycomb function in the same manner as the reaction products from the materials in passages. The sum of the elemental metal or metal hydride forming the honeycomb structure and the metal or metal hydride in the honeycomb passages and the liquid in the passages is in accordance with the liquid and the metal or metal hydride mole fractions in the chemical equations that govern the exothermic reaction.

The large surface area of the elemental metal or metal hydride in structure 31, which results from the particulate nature of the metal or metal hydride and the large surface area of the honeycomb structure, causes the exothermic chemical reaction to be very fast, as indicated supra. The large surface area of the honeycomb also promotes exposure of the liquid and metal or metal hydride particles to the high temperature gases in the plasma jet.

While either elemental metal or a metal hydride can be employed in chamber 13, the metal hydride is preferred because it generates more hydrogen gas for a given chamber 13 volume than the hydrogen generated by the elemental metal. Thereby the hydrogen gas that results from the reaction in chamber 13 has greater energy when the metal hydride is employed than when elemental metal is used. The energy in the gas generated in chamber 13 may be 1.5 times the electric energy coupled by source 27 to plasma source 11 because of the additional exothermic reaction energy.

The temperature of the pulsed plasma jet supplied by source 11 to chamber 13 and the type of metal or metal hydride in the chamber must be such that the metal oxide of the exothermic reaction is not vaporous. Reactions which have been found to satisfy this criterion are:

$$2Al + 3H_2O \rightarrow Al_2O_3 + 3H_2 + \epsilon_1 \quad (1)$$

$$Zr + 2H_2O \rightarrow ZrO_2 + 2H_2 + \epsilon_2 \quad (2)$$

$$Ti + 2H_2O \rightarrow TiO_2 + 2H_2 + \epsilon_3 \quad (3)$$

$$Ti + H_2O \rightarrow TiO + H_2 + \epsilon_4 \quad (4)$$

$$2Ti + 3H_2O \rightarrow Ti_2O_3 + 3H_2 + \epsilon_5 \quad (5)$$

$$Si + 2H_2O \rightarrow SiO_2 + 2H_2 + \epsilon_6 \quad (6)$$

$$2TiH_2 + 3H_2O \rightarrow Ti_2O_3 + 5H_2 + \epsilon_7 \quad (7)$$

$$ZrH_2 + 2H_2O \rightarrow ZrO_2 + 3H_2 + \epsilon_8, \quad (8)$$

where, $\epsilon_1-\epsilon_8$ respectively represent the heat generated in the eight exothermic reactions.

In each of the reactions represented by Equations (1)–(8), the plasma jet provides sustained heating of the water to superheated steam that diffuses through the large surface area of the metal or metal hydride particles. Essentially, the metal particles are suspended in a homogenous manner with the superheated steam that is diffusing through the particles. The reaction between the superheated steam and the elemental metal or metal hydride takes place while the metal hydride or elemental metal is in a solid state to form the oxide of the metal and the hydrogen gas. The metal oxide melts into a semi-liquid, non-vaporous state and gaseous hydrogen is generated as additional heat is applied by the plasma and the reaction. The pressure and temperature in chamber 13 are such that the metal oxide remains in the non-vapor state, while gaseous hydrogen is generated. Similar reactions occur if the $H_2O$ is replaced by $H_2O_2$ or by an $H_2O_2$—$H_2O$ mixture.

The pressure and temperature within chamber 13 are controlled as a function of the power and energy coupled by supply 27 to capillary discharge passage 21. The oxides indicated on the right side of each of Equations 1-8 have melting points in the range between approximately 750° C. and 2,700° C. The oxides vaporize at temperatures in the range from 2,600° C.–5,000° C. when they are at a pressure of one atmosphere. The vaporization temperature of each of the oxides, at the pressure in chamber 13 (much greater than one atmosphere) is considerably greater than the temperature needed to initiate the generation of the superheated steam. Superheated steam is generated from water if the plasma temperature is as low as 1,000° C.; if the liquid is $H_2O_2$ or an $H_2O_2$—$H_2O$ mixture, the plasma temperature needed to generate superheated steam is less than 1000° C. The heat produced by the exothermic reaction of the superheated steam and the metal or metal hydride is sufficient to cause the gaseous hydrogen to be formed without vaporizing the metal oxide.

To determine the necessary energy delivered by power source 27 to capillary passage 21, it is necessary to consider (1) the formation heat of the metal oxide and of the water, (2) the heat capacity of the oxide and hydrogen, (3) the heat of fusion and the heat per mole of the exothermic reaction, and (4) the temperature needed to initiate the reaction, i.e., to heat the water to approximately 1,000° C.

Titanium hydride ($TiH_2$) is a particularly advantageous metal hydride because the resulting oxide $Ti_2O_3$ is not likely to vaporize and because of the high mole fraction ratio (5:1) of the gaseous hydrogen to the titanium oxide produced by the reaction. For titanium hydride and water reactants in a 2:3 mole ratio it can be shown that power supply 27 must deliver approximately 200 kilo-Joules over approximately a 0.9 millisecond interval to drive projectile assembly 15 from rest through muzzle 19 over a distance of approximately 54 centimeters in barrel 16 if (a) projectile assembly 15 has a weight of approximately 60 grams, (b) the volume within chamber 13 is approximately 170 cubic centimeters, and (c) the volume in capillary passage 21 is approximately 20 cubic centimeters.

One structure for centrifugally separating the non-vaporous metal oxide from the gaseous hydrogen between chamber 13 and the inlet of barrel 16 is illustrated in FIG. 1 as chamber 35 that is coaxial with axis 12. Chamber 35 includes cylindrical portion 36 and annular portion 37, downstream of the cylindrical portion. Separating chamber 35 has an outer diameter equal to the diameter of reaction chamber 13 so that all fluids generated in the reaction chamber flow axially into chamber 35 in response to the high pressure applied to the reaction chamber by the plasma jet propagating through orifice 25. Annular portion 37 has an inner diameter approximately equal to the outer diameter of barrel 16 which fits into the space defined by the inner diameter of ring 37.

Ring 37 includes pocket 39, defined by inside wall 40 of the ring. In cross-section, wall 40 is shaped as a semi-circle having a diameter at right angles to the direction of travel of fluid flowing out of reaction chamber 13. The geometry of ring 37 is thus such that the low density hydrogen gas flowing into pocket 39 generally escapes and flows into barrel 16 after projectile assembly 15 has begun to move down the barrel. However, the higher density non-vaporous metal oxide flows axially and radially outwardly into ring 37 and adheres to the wall of pocket 39. The metal oxide semi-liquid striking the relatively cool pocket wall is solidified and collected on the pocket wall so that it does not enter barrel 16 and increase the atomic weight of the gases acting against the rear face of sabot 17.

Projectile 18 includes a tip which extends forwardly of the rounded front face of sabot 17. Projectile 18 extends completely through sabot 17, thence through chamber 35 and into honeycomb structure 31 so that the projectile back end abuts against membrane 32 immediately downstream of orifice 25. The end of projectile 18 embedded in honeycomb structure 31 includes fins 38 that may be fixed as illustrated or be initially retracted in the projectile and which may expand outwardly after the projectile separates from sabot 17, subsequent to assembly 15 passing through muzzle 19.

Figure 3:
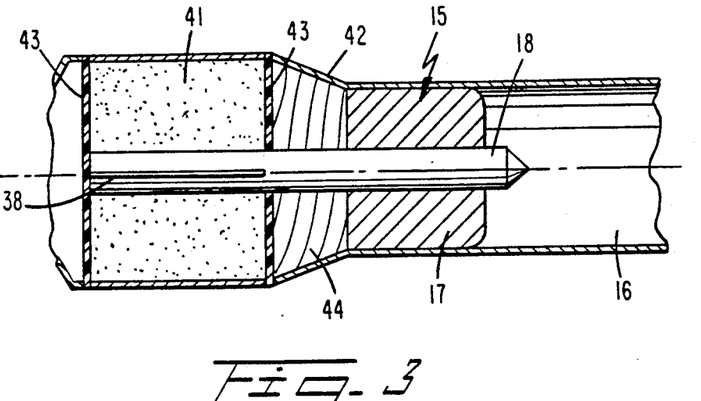
FIG. 3 is a partial schematic view of another embodiment of the invention wherein the liquid is premixed in a reaction chamber with a metal or metal hydride powder to form hydrogen and an oxide of the metal in response to a plasma discharge.

A modification of the apparatus illustrated in FIGS. 1 and 2 is partially and schematically illustrated in FIG. 3. In the embodiment of FIG. 3, the honeycomb structure 31 in reaction chamber 13 is replaced by a mixture of the hydrogen and oxygen containing liquid and particles of the elemental metal or the metal hydride in rigid cylindrical reaction chamber 41. Also, structure 42 for centrifugally separating the non-vaporous metal oxide from the hydrogen gas in the embodiment of FIG. 3 differs from chamber 35, FIG. 1.

Chamber 41 is bounded by parallel membrane faces 43 at right angles to axis 12. Faces 43 are constructed in the same manner and perform the same function as membranes 32. Chamber 41 has an interior cylindrical wall that defines a central hollow portion into which the tail of projectile 18 extends. The metal or metal hydride particles are evenly distributed as a mixture in the liquid in chamber 41. If there is a possibility of the metal or metal hydride reacting with the liquid in chamber 41 prior to the plasma jet propagating through orifice 25, the metal or metal hydride particles are coated with a water insoluble material that is melted in response to the water being superheated by the pulsed plasma jet derived by source 11.

Centrifugal separator 42 is a frusto-conical container which tapers from the outer diameter of chamber 41 to the smaller diameter of barrel 16. The relatively cool interior wall of separator 42 is rifled, i.e., contains spiral grooves 44, into which the non-vaporous metal oxide molecules are flung by centrifugal force to be trapped and solidified. The hydrogen gas is directed from chamber 41 through separator 42 against the rear face of sabot 17, without the presence of the relatively high molecular weight metal oxide non-vaporous molecules. The hydrogen gas flowing through tapered separator 42 acts against the rear face of sabot 17 to push projectile assembly 15 through barrel 16.

Figure 4:
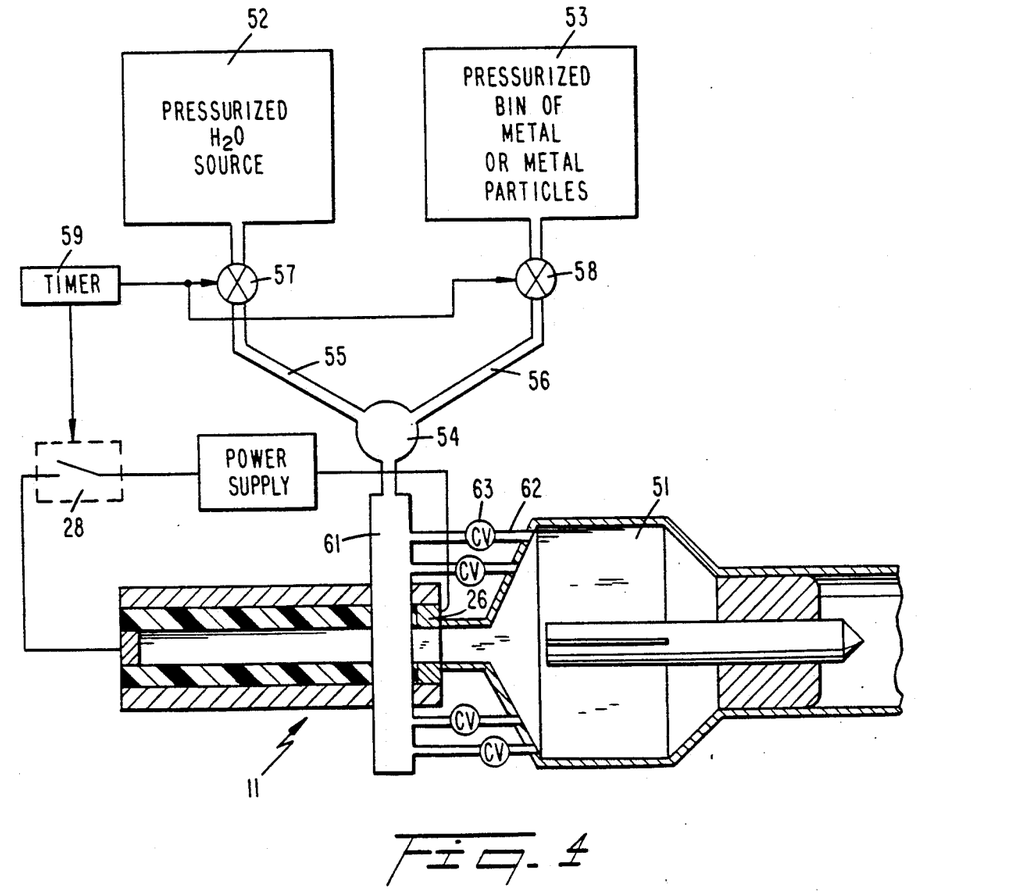
FIG. 4 is a partial schematic diagram of another embodiment of the present invention wherein hydrogen and elemental metal or a metal hydride are introduced into a projectile launcher immediately prior to a plasma discharge being initiated.

Reference is now made to FIG. 4 of the drawing wherein the structure of FIGS. 1–3 is modified so that the hydrogen and oxygen containing liquid and elemental metal or metal hydride particles are supplied to reaction chamber 51 from pressurized liquid container 52 and pressurized bin or container 53 that contains the metal or metal hydride particles. The particles are dispensed as fluidized materials from bin 53. The liquid and particles in containers 52 and 53 are supplied to reaction chamber 51 by way of mixing chamber 54, in turn connected to lines 55 and 56 in which valves 57 and 58 are respectively located. Valves 57 and 58 are opened immediately prior to switch 28 being closed in response to electric signals derived from electric timer 59. The liquid and fluidized particles flowing into mixing chamber 54 are homogeneously mixed in the chamber.

The mixture flows from chamber 54 into manifold 61 having multiple outlet ports that lead to conduits 62. Conduits 62 feed the liquid-particle mixture via check valves 63 into the same side of reaction chamber 51 as the side of the reaction chamber which is responsive to the high pressure plasma jet derived from source 11. The plasma jet and the flow of the liquid-particle mixture into reaction chamber 51 is thus coaxial, with the plasma jet being supplied to the reaction chamber a few milliseconds after the complete application of the mixture to the reaction chamber under the control of timer 59. The liquid-particle mixture is heated by the plasma jet to provide the same exothermic reactions mentioned supra in connection with FIG. 1.

The resulting hydrogen gas and non-vaporous metal oxide are supplied to a centrifugal separating chamber, of the type previously described in connection with FIGS. 1 or 3. The hydrogen gas is applied with high pressure to the rear face of sabot 17 of projectile assembly 15, in the same manner as described supra in connection with FIGS. 1 and 3. As in the embodiment of FIG. 3, the tail of projectile 18 extends into reaction chamber 51 prior to the projectile assembly being accelerated by the high pressure hydrogen gas.

While there have been described and illustrated several specific embodiments of the invention, it will be clear that variations in the details of the embodiments specifically illustrated and described may be made without departing from the true spirit and scope of the invention as defined in the appended claims.

We claim:

1. Apparatus for accelerating a projectile comprising a barrel through which the projectile is accelerated, a source of controlled temperature plasma gas jet having a predetermined propagation direction, a hydrogen generator positioned downstream of the source to be responsive to the plasma jet for generating high pressure hydrogen gas in a chamber in flow relation with the barrel and the source so the chamber is behind the projectile, the hydrogen generator including a liquid having hydrogen and oxygen and elemental metal or a metal hydride, the elemental metal or metal hydride and the temperature of the jet being such that high pressure elemental hydrogen gas and a non-vaporous oxide compound of the metal are formed by an exothermic reaction of the liquid reacting with the elemental metal or metal hydride under the control of the plasma jet, and means for applying the high pressure hydrogen gas without substantial presence of the metal oxide compound to the barrel so the hydrogen gas accelerates the projectile through the barrel.

2. The apparatus of claim 1 wherein the liquid consists essentially of water.

3. The apparatus of claim 1 wherein the liquid is a mixture of water and hydrogen peroxide with a volumetric ratio of the water to the hydrogen peroxide no greater than 3:7.

4. The apparatus of claim 1 wherein the liquid includes $H_2O_2$.

5. The apparatus of claim 1 wherein the plasma gas source comprises means including an elongated passage with a dielectric wall having ionizable material thereon, the passage having opening means through which the plasma jet passes, means for establishing an electric discharge having a controlled current between spaced regions along the length of the passage to ionize the material and form a plasma in the passage, the plasma in the passage forming a plasma jet that flows out of the opening means.

6. The apparatus of claim 1 wherein the hydrogen generator comprises a compartmented structure in the chamber, first compartments in the structure including the elemental metal or the metal hydride, second compartments in the structure including the liquid, third compartments in the structure being free of solids and liquids so that the plasma can flow through them more easily than through the first and second compartments, the structure being formed so that it melts in response to the plasma so the liquid in the second compartments mixes with and reacts exothermically with the metal or metal hydride to produce the gaseous hydrogen and the metal oxide, the amounts of the liquid and elemental metal or metal hydride in the structure complying with mole fractions necessary for the exothermic reaction.

7. The apparatus of claim 6 wherein the structure has a honeycomb shape with elongated passages forming the compartments, the passages extending in the jet propagation direction.

8. The apparatus of claim 6 wherein the structure is a hydrocarbon that is vaporized in response to the plasma.

9. The apparatus of claim 6 wherein the structure is formed of the same metal element or metal hydride that is in the first compartments.

10. The apparatus of claim 1 wherein the hydrogen generator comprises a mixture of the liquid and particles of the elemental metal or metal hydride in said chamber.

11. The apparatus of claim 10 wherein said particles have a water insoluble outer coating that is melted by heat from the plasma gas jet.

12. The apparatus of claim 1 wherein the hydrogen generator comprises separate sources of the liquid and particles of the elemental metal or metal hydride, means connected to said liquid and particle sources for feeding the liquid and particles into the chamber immediately prior to the hydrogen generator being responsive to the jet from the plasma gas source.

13. The apparatus of claim 1 wherein the hydrogen gas is generated in a central part of the chamber and the metal oxide is generated in a radial peripheral portion of the chamber, the means for applying including structure for separating the metal oxide in the peripheral portion from the hydrogen gas as a result of the location and density of the metal oxide relative to that of the hydrogen gas.

14. The apparatus of claim 13 wherein the structure is a centrifugal separator having means for collecting and solidifying the metal oxide and for directing the gaseous hydrogen radially inwardly.

15. The apparatus of claim 14 wherein the chamber has an inner diameter greater than that of the barrel and the centrifugal separator has a peripheral interior wall that is tapered inwardly from the chamber toward the barrel, the interior wall including spiral groove means for collecting the metal oxide and in which the collected metal oxide is solidified.

16. The apparatus of claim 14 wherein the chamber has pocket means extending between the chamber and barrel inner diameters for collecting the metal oxide and in which the collected metal oxide is solidified.

17. In an exothermic hydrogen generator responsive to a plasma jet having a controlled temperature, a compartmented structure, first compartments in the structure including elemental metal or a metal hydride, second compartments in the structure including a liquid containing hydrogen and oxygen, third compartments in the structure being free of solids and liquids so that the plasma can flow through them more easily than through the first and second compartments, the structure being formed so that in response to the plasma it melts and the liquid in the second compartments mixes with and reacts exothermically with the metal or metal hydride to produce gaseous hydrogen and a metal oxide, the amounts of the liquid and elemental metal or metal hydride in the structure being such that the mole fractions of the exothermic reaction are satisfied, the elemental metal or metal hydride and the temperature of the plasma being such that the metal oxide of the exothermic reaction is not a vapor.

18. The generator of claim 17 wherein the liquid is water.

19. The generator of claim 17 wherein the liquid is a mixture of water and hydrogen peroxide with a volumetric ratio of the water to the hydrogen peroxide no greater than 3:7.

20. The generator of claim 17 wherein the liquid includes $H_2O_2$.

21. The generator of claim 17 wherein the jet has a predetermined propagation direction and the structure has a honeycomb shape with elongated passages extending in the jet propagation direction forming the compartments.

22. The generator of claim 17 wherein the structure is a hydrocarbon that is vaporized in response to the plasma.

23. The generator of claim 17 wherein the structure is formed of the same metal element or metal hydride that is in the first compartments.

24. The generator of claim 17 wherein the metal or metal hydride is in particulate form.

25. The generator of claim 24 wherein the metal or metal hydride particles have an exterior water insoluble coating.

26. The generator of claim 17 in combination with a source of the controlled temperature plasma, said plasma source including means forming an elongated passage having a dielectric wall having ionizable material thereon, means for establishing an electric discharge having a controlled current between spaced regions along the passage to cause a high pressure plasma jet to be formed in the passage, the passage having opening means through which the high pressure plasma jet propagates, the compartmented structure being positioned downstream of the opening means to be responsive to the jet propagating through the opening means.

27. The generator of claim 26 further including a barrel having a breech section for holding a projectile at a position downstream of the compartmented structure so that the gaseous hydrogen is supplied to the projectile with high pressure to accelerate the projectile through the barrel with high velocity.

28. The generator of claim 27 further including means between the breech section and the structure for separating the gaseous hydrogen from the non-vaporous metal oxide so that the gaseous hydrogen is applied to the projectile in the breech without substantial amounts of the oxide being present.

29. A method of generating gaseous hydrogen comprising the steps of applying electric energy to a liquid including hydrogen and oxygen molecules and elemental metal or a metal hydride, the electric energy heating the liquid and metal or metal hydride to a temperature to produce an exothermic reaction between the liquid and elemental metal or metal hydride, the energy level of the applied electric energy being such that the exothermic reaction results in the generation of gaseous hydrogen and a non-vaporous oxide compound of the metal, and separating the gaseous hydrogen from the non-vaporous oxide compound.

30. The method of claim 29 wherein the liquid consists essentially of water.

31. The method of claim 29 wherein the liquid is a mixture of water and hydrogen peroxide with a volumetric ratio of the water to the hydrogen peroxide no greater than 3:7.

32. The method of claim 29 wherein the liquid includes $H_2O_2$.

33. The method of claim 29 wherein the metal hydride is titanium hydride.

34. The method of claim 29 wherein the separation is centrifugal so the hydrogen is directed radially inwardly and the metal oxide is directed radially outwardly, and collecting the separated metal oxide.

35. The method of claim 34 further comprising the step of solidifying the collected separated metal oxide.

36. The method of claim 29 wherein the electric energy generates a plasma having a controlled temperature.

37. The method of claim 29 wherein the liquid and elemental metal or metal hydride are located in separate compartments of a structure that is melted in response to the electric energy, the liquid and elemental metal or metal hydride in the compartments being mixed to form a mixture in response to the structure being melted, the mixture being heated by the electric energy to produce the exothermic reaction.

38. The method of claim 37 wherein the compartments include walls consisting of the metal or metal hydride, the metal or metal hydride in the walls being melted by the electric energy to react with the liquid to form the gaseous hydrogen and metal oxide.

39. The method of claim 29 further including the step of applying the gaseous hydrogen as a high pressure pulsed gas jet to a projectile to accelerate the projectile.

40. The method of claim 29 further comprising the step of flowing the liquid and particles of the metal or metal hydride into a chamber from separate sources to form a mixture of them in the chamber immediately prior to application of the plasma to the mixture.

41. A method of accelerating a projectile through a barrel comprising the steps of generating a high pressure hydrogen gas jet by exothermically reacting a liquid including hydrogen and oxygen molecules with elemental metal or a metal hydride, controlling the temperature of the reaction so a non-vaporous oxide of the metal is a product of the reaction by controlling the energy level of electric energy which is applied to the liquid and metal or metal hydride to cause the reaction, separating the hydrogen from the non-vaporous metal oxide, and applying the separated hydrogen to the barrel to accelerate the projectile through the barrel.

42. The method of claim 41 wherein the liquid consists essentially of water.

43. The method of claim 41 wherein the liquid is a mixture of water and hydrogen peroxide with a volumetric ratio of the water to the hydrogen peroxide no greater than 3:7.

44. The method of claim 41 wherein the liquid includes $H_2O_2$.

45. The method of claim 41 wherein the electric energy is a plasma discharge having controlled power as a function of time.

46. Apparatus for generating gaseous hydrogen comprising a reaction chamber having a liquid including hydrogen and oxygen molecules and an elemental metal or a metal hydride therein, means for supplying electric energy having controlled power to the chamber, the power of the electric energy supplied to the chamber being sufficient to heat the liquid and the metal or metal hydride to a temperature to cause an exothermic reaction between the liquid and the elemental metal or the metal hydride; the power, the energy and the metal or metal hydride being such that gaseous hydrogen and a non-vaporous oxide of the metal are products of the reaction, and means for separating the gaseous hydrogen from the non-vaporous metal oxide.

47. The apparatus of claim 46 wherein the liquid consists essentially of water.

48. The apparatus of claim 46 wherein the liquid is a mixture of water and hydrogen peroxide with a volumetric ratio of the water to the hydrogen peroxide no greater than 3:7.

49. The apparatus of claim 46 wherein the liquid includes $H_2O_2$.

50. The apparatus of claim 46 wherein the means for separating is a centrifugal separator so the hydrogen is directed radially inwardly and the metal oxide is directed radially outwardly.

51. The apparatus of claim 50 wherein the centrifugal separator includes means for collecting and solidifying the metal oxide.

52. The apparatus of claim 46 wherein the electric energy is a plasma having controlled temperature.

53. The apparatus of claim 52 wherein the liquid and elemental metal or metal hydride are located in separate compartments of a structure that is melted in response to the plasma, the liquid and elemental metal or metal hydride in the compartments being mixed to form a mixture in response to the structure being melted, the mixture being heated by the plasma to produce the exothermic reaction.

54. The apparatus of claim 53 wherein the compartments include walls consisting of the metal or metal hydride, the metal or metal hydride in the walls being melted by the plasma to react with the liquid to form the gaseous hydrogen and metal oxide.

55. The apparatus of claim 52 wherein the reaction chamber includes a compartmented structure, first compartments in the structure including the elemental metal or the metal hydride, second compartments in the structure including the liquid, third compartments in the structure being free of solids and liquids so that the plasma can flow through them more easily than through the first and second compartments, the structure being formed so that it melts in response to the plasma so the liquid in the second compartments mixes with and reacts exothermically with the metal or metal hydride to produce the gaseous hydrogen and the metal oxide, the amounts of the liquid and elemental metal or metal hydride in the structure complying with mole fractions necessary for the exothermic reaction.

56. The apparatus of claim 55 wherein the plasma has a direction of propagation into the reaction chamber, the structure having a honeycomb shape with elongated passages forming the compartments, the passages extending in the propagation direction.

57. The apparatus of claim 55 wherein the structure is a hydrocarbon that is vaporized in response to the plasma.

58. The apparatus of claim 55 wherein the structure is formed of the same metal element or metal hydride that is in the first compartments.

59. The apparatus of claim 46 wherein the chamber includes a mixture of the liquid and particles of the elemental metal or metal hydride.

60. The apparatus of claim 59 wherein said particles have a water insoluble outer coating that is melted by heat from the plasma.

61. The apparatus of claim 46 further including separate sources of the liquid and particles of the elemental metal or metal hydride, means connected to said liquid and particle sources for feeding the liquid and particles into the chamber so the liquid and particles are in the chamber while the electric energy is supplied to the chamber.

62. Apparatus for accelerating a projectile comprising a barrel through which the projectile is accelerated, a source of plasma gas jet, a chemical compound including hydrogen and oxygen, a mass of elemental metal or a metal hydride, the jet, the compound, and the mass being positioned to interact with each other for generating high pressure gas in a chamber in flow relation with the source and barrel so the chamber is behind the projectile, the temperature of the jet, the compound and the mass being such that the high pressure gas is formed by an exothermic chemical reaction of the compound and mass in response to the plasma jet and the compound and the mass interacting with each other, the plasma gas source including:

means including an elongated passage with a dielectric wall having ionizable material thereon, the passage having opening means through which the plasma jet passes, means for establishing an electric discharge having a controlled current between spaced regions along the length of the passage to ionize the material and form a plasma in the passage, the plasma in the passage forming a plasma jet that flows out of the opening means to be incident on the compound, and means for applying the high pressure gas to the barrel so the gas accelerates the projectile through the barrel.

63. The apparatus of claim 62 wherein the compound consists essentially of $H_2O$.

64. The apparatus of claim 62 wherein the passage is a capillary passage.

65. Apparatus for accelerating a projectile comprising a source of plasma gas jet, a chemical compound including hydrogen and oxygen, a mass of elemental metal or a metal hydride, the jet, compound and mass being positioned to interact with each other for generating high pressure gas in a confined chamber behind the projectile, the temperature of the jet, the compound and the mass being such that the high pressure gas is formed by an exothermic chemical reaction of the compound and the mass in response to the plasma jet and the compound and the mass interacting with each other, the gas formed in the confined chamber acting on the rear of the projectile with sufficient pressure to accelerate the projectile to a relatively high velocity, the plasma gas source comprising means including an elongated passage with a dielectric wall having ionizable material thereon, the passage having opening means through which the plasma jet passes into the confined chamber and behind the projectile, means for establishing an electric discharge having a controlled current between spaced regions along the length of the passage to ionize the material and form a plasma in the passage, the plasma in the passage forming a plasma jet that flows out of the opening means to interact with the compound.

66. The apparatus of claim 65 wherein the compound consists essentially of $H_2O$.

67. The apparatus of claim 65 wherein the passage is a capillary passage.

68. The apparatus of claim 65 wherein the compound and mass are such that the high pressure gas comprises $H_2$ atoms.

69. The apparatus of claim 65 wherein the compound and mass are in intimate contact with each other in the chamber prior to the jet interacting therewith.

70. The apparatus of claim 65 wherein the compound and mass are respectively water and aluminum.

71. The apparatus of claim 65 wherein the compound and mass and the plasma jet are such that, in response to the plasma jet interacting with the compound and mass, particles of the mass are essentially suspended in a homogeneous manner with superheated steam that is diffusing through the particles.

72. A method of accelerating a projectile comprising the steps of deriving a plasma gas jet by applying a discharge current to a dielectric ionizable substance along a wall of an elongated passage, interacting the plasma gas jet with a chemical compound including hydrogen and oxygen, as well as a mass of elemental metal or a metal hydride, the compound and the mass being positioned behind the projectile, the plasma jet being injected from the passage into the compound and mass, an exothermic chemical reaction occurring between the compound and the mass while they interact with the plasma jet, the exothermic reaction forming high pressure gas in a confined chamber behind the projectile, and applying the confined high pressure gas in the chamber to the projectile to drive the projectile.

73. The method of claim 72 wherein the compound consists essentially of $H_2O$.

74. The method of claim 72 wherein the compound and mass are such that the high pressure gas comprises $H_2$ atoms.

75. The method of claim 72 wherein the compound and mass are in intimate contact with each other in the chamber prior to the jet interacting therewith.

76. The method of claim 72 wherein the compound and mass are respectively water and aluminum.

77. The method of claim 72 wherein the compound and mass and the plasma jet are such that, in response to the plasma jet interacting with the compound and mass, particles of the mass are essentially suspended in a homogeneous manner with superheated steam that is diffusing through the particles.

* * * * *